No. 729,363. PATENTED MAY 26, 1903.
G. H. LEE.
CAMERA.
APPLICATION FILED JAN. 8, 1903.
NO MODEL. 2 SHEETS—SHEET 1.
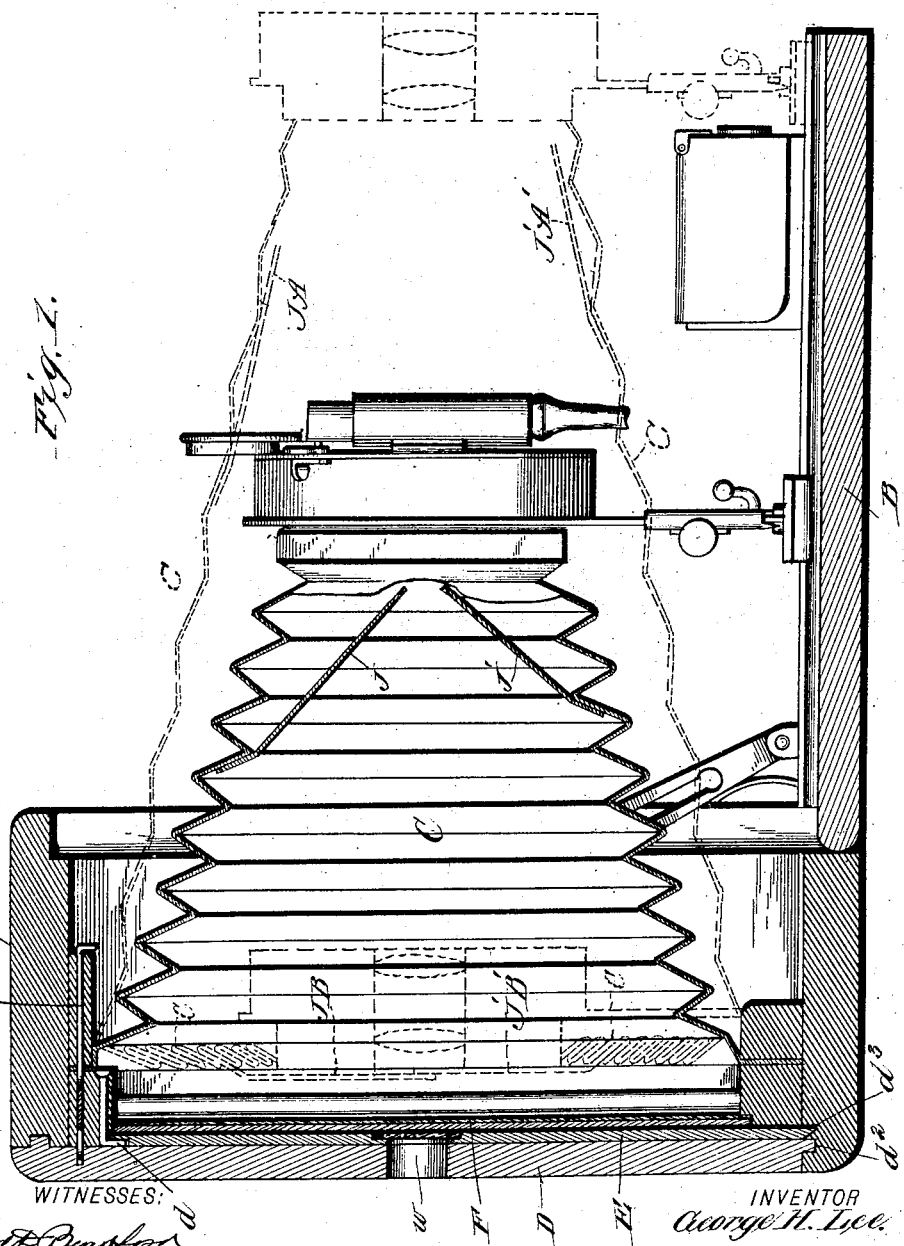
WITNESSES:
Fred L Bradford
Edw. W. Byrn
INVENTOR
George H. Lee
BY Munn & Co.
ATTORNEYS.

No. 729,363. PATENTED MAY 26, 1903.
G. H. LEE.
CAMERA.
APPLICATION FILED JAN. 8, 1903.
NO MODEL. 2 SHEETS—SHEET 2.
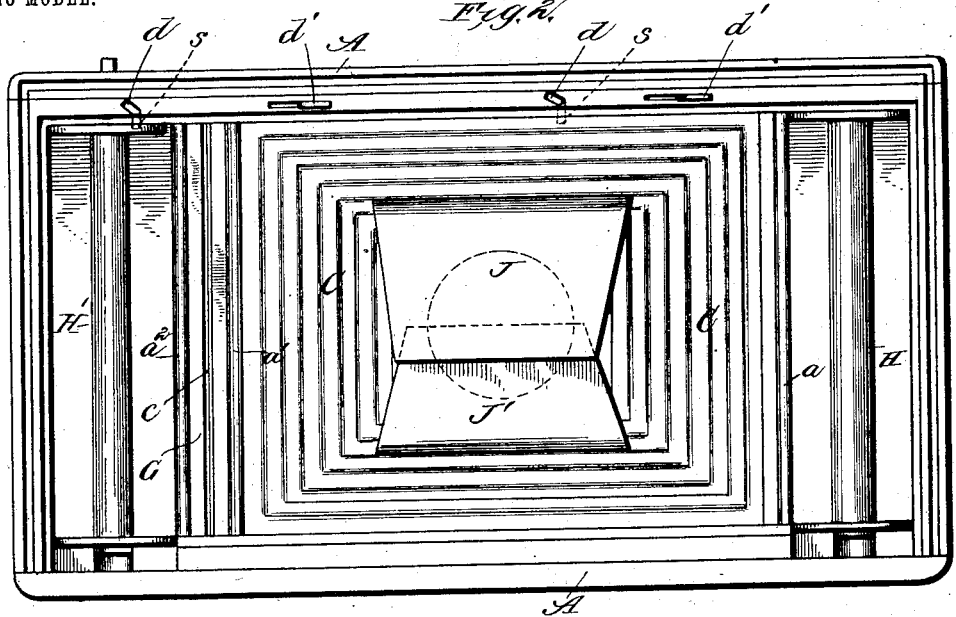
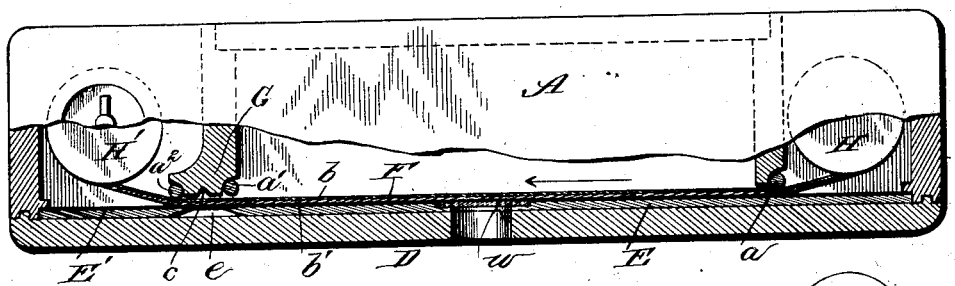
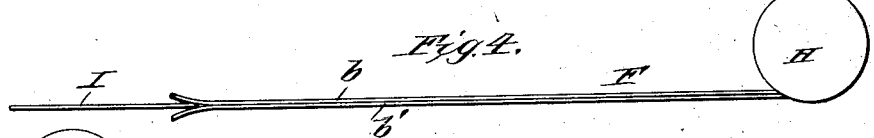
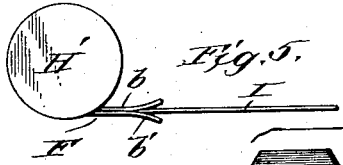
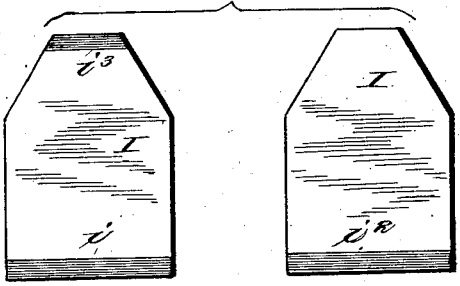
WITNESSES:
Fred P. Bradford
Edw. W. Byrn.
INVENTOR
George H. Lee
BY Munn & Co.
ATTORNEYS.

No. 729,363.

Patented May 26, 1903.

UNITED STATES PATENT OFFICE.

GEORGE H. LEE, OF OMAHA, NEBRASKA.

CAMERA.

SPECIFICATION forming part of Letters Patent No. 729,363, dated May 26, 1903.

Application filed January 8, 1903. Serial No. 138,279. (No model.)

*To all whom it may concern:*

Be it known that I, GEORGE H. LEE, a citizen of the United States, and a resident of Omaha, in the county of Douglas and State of Nebraska, have made certain new and useful Improvements in Cameras, of which the following is a specification.

My invention is in the nature of an improvement in film-cameras, having for its object the severance of the film at any desired point, when only a part of it has been exposed, and the development of the exposed part of the film and the preservation of the balance of the film in proper position, with suitable connections for subsequent use, the whole operation being conducted in daylight and without the use of a dark room.

My invention consists in such construction of camera and its accessories as permit this operation to be successfully and conveniently carried out, and which improvement is applicable to any film-camera by slight adaptations or alterations, as will be hereinafter described with reference to the drawings, in which—

Figure 1 is a vertical longitudinal section of my camera, showing in full lines the bellows partly extended and showing in dotted lines also two other positions of the bellows, one dotted position showing the bellows fully extended and the other dotted position showing the bellows fully folded. Fig. 2 is a rear view of the camera with the main and supplemental backs removed. Fig. 3 is a plan view, partly in section, of the upper edge of the camera fully folded into its most compact limits. Figs. 4, 5, and 6 are detail views of parts for carrying into full and complete effect the fundamental features of my invention.

In the drawings, Fig. 1, A represents the box-casing of a folding camera, one side of which, B, is hinged so as to be folded down into a horizontal position, as shown, and out upon which the bellows C and the lens may be extended, as is common in this class of cameras. In the ends of the camera (see Fig. 3) are arranged the two spools H and H', from one of which, H, the sensitive film is unwound and upon the other of which, H', the film is wound up after having been exposed, and which spools are made removable in the usual way for daylight loading and unloading. The film F extends across the back of the chamber behind the bellows and receives when exposed through the lens the image, the film being of the usual kind with a sensitive front face $b$ and an opaque paper lining $b'$ at the back, which are wound and unwound together. As the film (see Fig. 3) moves from one spool H to the other one, H', it passes over distending rollers in the back of the camera, which in my invention are three in number, one at $a$ near the spool H on one side of the field and the other two at $a'\ a^2$ on the other side of the field and near the spool H'. The two rollers $a'\ a^2$ are separated about three-quarters of an inch from each other and have between them a rigid table-surface G, having, preferably, a crease $c$ to receive a knife in severing transversely the film.

My camera has two detachable backs, one of them, D, being an outside back, secured to the box-casing in any suitable way, as by a flange $d^2$ at the bottom (see Fig. 1) and a locking-catch $d'$ at the top, as usual. This back is coextensive with the rear side wall and is imperforate, except for a ruby-glass window $w$, through which the numbers of the film may be seen from the outside. Inside of this external back is another supplemental back composed of two pieces E and E', which are separated from each other by a space $e$, Fig. 3, forming a transverse channel immediately behind the crease $c$ in the table-surface G between the two rollers $a'\ a^2$. These two rollers $a'\ a^2$ are so placed and adjusted as to pinch slightly the film between them and the adjacent parallel edges of the supplemental-back sections E and E', so as to firmly hold the film while it is being severed by a transverse cut with a knife along the line of the crease $c$. The sections E E' of the supplemental back are detachably held in place by having their lower edges, as at $d^3$, Fig. 1, caught and retained in a groove of the case and by having their upper edges retained by a movable turn-key $d$, which passes through a keyhole-slot $s$, as in Fig. 2, and is then turned out of registration with the same. After a number of exposures have been made on the film and the exposed sections have been wound onto the spool H' the outside back D is taken off, leaving the back of the film visible along a transverse space through the opening e. A knife or pair of scissors is used to sever the film by a cut in line with the crease c. The severed edges of the film are now pinched and held by the pressure of the rollers $a'$ $a^2$ on each side of the line of cut. The cut ends of the film now show two thicknesses on each side of the cut, one the sensitive film and the other the opaque paper backing, and these have to be connected and adapted to independent use, for which purpose I use supplemental terminal tabs of black paper, as shown in Fig. 6, which shows the front and back faces of one of these tabs. The tab at one end is gummed on both sides $i$ and $i^2$ and at the other end is gummed on one side only, as at $i^3$. One of these tabs is now taken and its double-gummed edge $i$ $i^2$ is inserted between the sensitive film $b$ and the opaque paper back $b'$ of the exposed portion of the film which has been wound on spool H', as seen in Fig. 5. The spool H', with the exposed portion of the film, is now taken out of the camera and the film end secured by rolling it up and pasting down the gummed end $i^3$ of the terminal tab, so as to make it self-contained and safe. Another supplemental tab I is then in like manner inserted between the sensitive strip and paper backing of the unexposed section of the film, as seen in Fig. 4. A new spool is then put in the camera in the place of the removed spool H', and the tab end of this section is now made fast to the new spool, and the camera is now ready to receive subsequent exposures on the remaining unexposed portion of the film. This operation is conducted without removing the unexposed portion of the film from the camera and without subjecting it to the light, since it is fully covered and protected by the supplemental back E, and the operation may therefore be conducted in daylight and without the use of a dark room, thus permitting the very desirable results of my invention to be obtained without any inconvenience or risk whatever.

The inside face of the supplemental back E E' is preferably lined with velvet or some soft material to form a bed for the film to lie against and to allow it to move easily in unwinding, and the back may be detachably held in place by any suitable catches in the place of those described. In some applications of my invention it is not necessary to have two backs behind the film, but the outer back E may be dispensed with.

In connection with my camera as thus described I have provided a means for preventing the accidental or inadvertent exposure of the film when the bellows of the camera is folded, and for this purpose I simply attach by glue or small rivets to the inner walls of the bellows of the camera two opaque wings J J' of some light material, such as stiff black paper, or rubber, or celluloid. The edges are so caught in the plaits of the bellows that when the bellows is fully extended and the plaits are drawn out nearly straight these wings lie flat against the walls of the bellows, as indicated by the dotted lines J A and J' A', which permits the full image of the lens to be thrown on the film, and when the bellows is fully folded the position assumed by the plaits of the bellows causes these wings to lap fully across the field, as shown by dotted lines J B J' B', and completely masks the film from the lens, so that if the shutter-bulb be accidentally worked it does not spoil the film. This action is accomplished in a perfectly automatic manner by the mere drawing out or shutting up of the bellows, and by the most simple, reliable, and practical construction, costing only a trifle for its application to any camera.

With reference to the feature just described I would state that I make no claim to the same in this application for a patent, as it has been embodied in and forms the subject-matter of a separate application for a patent filed this same date.

Having thus described my invention, what I claim as new, and desire to secure by Letters Patent, is—

1. A film-camera consisting of an outer casing, film-spools arranged on opposite sides of the camera adapted to receive and feed a sensitive film across the field, means for holding the film and excluding the light along two lines at one side of the field transversely to the film and near one of the spools, the casing being made with an elongated opening extending transversely to the film between said two lines, to permit the severance of the film between these lines in daylight and by the external application of a cutting-tool substantially as described.

2. A film-camera consisting of an outer casing, film-spools arranged on opposite sides of the camera adapted to receive and feed a sensitive film across the field, means for holding the film and excluding the light along two lines located at one side of the field transversely to the film and near one of the spools, a bearing-surface in front of the plane of the film and between these two lines, the casing being made with an elongated opening extending transversely to the film between said two lines and at a point behind the film, and directly opposite the bearing-surface in front of the film to permit the severance of the film with an externally-applied cutting-tool substantially as described.

3. A film-camera having near one of its spools an opening through the casing extending transversely to the film and a roller arranged on each side of the opening adapted to pinch and hold the severed edges of the film against the edges of said opening substantially as and for the purpose described.

4. A film-camera consisting of an outer casing having a double back, the outer one removable and the inner one having a transverse opening near one side of the camera, film-spools arranged on opposite sides of the camera adapted to receive and feed a sensitive film across the field, means for holding the film along each edge of the transverse opening in the inner portion of the back substantially as and for the purpose described.

5. A film-camera having near one of its spools an opening through the casing extending transversely to the film, a stationary table-surface opposite said opening and a roller at each side of said table-surface substantially as and for the purpose described.

6. A film-camera having a main and supplemental back, the main back being coextensive with the camera-case, and the supplemental back being made in two sections of different size arranged inside the main back and approaching each other but spaced apart to leave a transverse opening near one of the spools substantially as and for the purpose described.

GEORGE H. LEE.

Witnesses:
 EDW. W. BYRN,
 SOLON C. KEMON.